United States Patent [19]
Ueda

[11] Patent Number: 5,475,933
[45] Date of Patent: Dec. 19, 1995

[54] WEIGHING MACHINE WITH FOOT DRYER

[75] Inventor: Katsuhiro Ueda, Ogaki, Japan

[73] Assignee: Ogaki Seiko Co., Ltd., Gifu, Japan

[21] Appl. No.: 343,910

[22] Filed: Nov. 17, 1994

[51] Int. Cl.[6] .................................................. F26B 19/00
[52] U.S. Cl. .................................. 34/90; 34/536; 34/427; 177/245; 177/264; 392/380
[58] Field of Search .............................. 34/536, 427, 90, 34/91, 443, 574; 177/60, 50, 245, 264, 256; 392/380, 383

[56] References Cited

U.S. PATENT DOCUMENTS

| | | | |
|---|---|---|---|
| 1,658,489 | 2/1928 | Lindstrom . | |
| 2,779,856 | 1/1957 | Fahner | 219/39 |
| 2,953,805 | 9/1960 | Sevenich | 15/310 |
| 3,378,009 | 4/1968 | Peplin | 128/266 |
| 3,683,896 | 8/1972 | Peplin | 128/24.2 |
| 4,458,771 | 7/1984 | Hanssen et al. | 177/256 |
| 4,666,007 | 5/1987 | Knothe et al. | 177/245 |
| 4,782,601 | 11/1988 | Gonzalez | 34/233 |
| 5,325,604 | 7/1994 | Little | 34/536 |

Primary Examiner—Denise L. Gromada
Attorney, Agent, or Firm—Joseph W. Berenato, III

[57] ABSTRACT

The invention described herein is a weighing and foot drying machine comprising a weighing machine for measuring one's weight; and a pair of foot dryers for drying user's feet standing on the weighing and foot drying machine; wherein the weighing machine is integrally assembled with the foot dryers in order to have a simplified structure and to be available with lower cost for providing usage of increased ease and popularity. In response to a user stepping onto a upper casing 1 of the weighing and foot drying machine, a supporting member 12 pushes a bar member correspondingly to the weight of the user, thereby a supporting member 32 moves downward against the biasing force of a spring 34 and rotates a turning member 36, whereby a movable pole 37 moves linearly which causes a limit switch 40 to turn on and a pinion 42 to rotate for driving a scale plate 44. The weight of the user is thus displayed through an indicating window 2 of the upper casing 1 and simultaneously blowers 6 operate to blow air flows from blowout holes of the upper casing 1 for drying the user's feet.

3 Claims, 5 Drawing Sheets

WEIGHING MACHINE WITH FOOT DRYER

BACKGROUND OF THE INVENTION

1. Field of the Invention

The present invention relates to a weighing and foot drying machine, particularly, to a weighing and foot drying machine of a simplified structure comprising a weighing machine and a pair of feet dryers wherein the weighing machine is integrally assembled with the foot dryers.

2. Description of Prior Art

For a long time, such a weighing machine (bathroom scales) is in common use even in an average family as a simple barometer device in order to keep one's health. Normally, the weighing machine is placed in a dressing section of a bathroom or the like to use for weighing oneself after taking a bath.

A foot dryer for drying one's feet may exist in the market, but it is relatively expensive so that it has hardly come in the market, and consequently has almost not spread. However, such a foot dryer itself is preferably used in an office or one's home while sitting in a chair to put his or her feet on the foot dryer and turning on the switch thereof to blow air flow for drying one's feet.

Conventionally, the weighing machine and the foot dryer as mentioned above are manufactured respectively as separate goods and sold. Therefore, the foot dryer can hardly reduce manufacturing cost which results to build up its image as a health instrument strongly rather than a necessary article and makes the dryer to be unsuitable for mass sales.

When wiping up one's own wet feet thoroughly after taking a bath or the like, it is necessary, however, to bend oneself toward one's feet, which makes him or her tend to quit wiping the feet since such it is a tiresome motion for many people. Furthermore, even if one's own wet feet are wiped out by a towel, the feet are not yet sufficiently dried off since it takes some short time before the feet are completely dried. Recently, washing of hair through showering or full bath in the morning is prevalent, particularly among the younger generation, but with such a bath it is difficult to dry quickly not only one's hair but also her toes in a short time in the busy morning. Under these circumstances as mentioned above, the foot dryer would have potential demand, but has failed to gain popularity since it is expensive and has a strong image as a special machine.

SUMMARY OF THE INVENTION

It is therefore an object of the present invention to provide a weighing and foot drying machine which has a simplified structure available as a low cost product by integrally assembling a weighing machine and a pair of feet dryers, such that it can easily be used, and widely popularized. It is a further object of the present invention to provide a weighing and foot drying machine which can be used not only with the average home, but also with several facilities including public bathhouses, recreation centers, aged people's homes, hotels, club houses for Golf courses and the like.

According to a first embodiment of the weighing and foot drying machine of the present invention, it comprises a weighing machine for measuring one's weight, and a pair of foot dryers for drying feet of a person weighing on the weighing and foot drying machine wherein the weighing machine is integrally assembled with the foot dryers.

Further, according to a second embodiment of the weighing and foot drying machine of the present invention, said foot dryers are preferably operated by stepping onto the weighing and foot drying machine.

Furthermore, according to the third embodiment of the present invention, the foot dryers provide warm air flow blowing therefrom.

According to a first embodiment of the weighing and foot drying machine of the present invention, the weighing machine is integrally assembled with the foot dryers such that a person may dry his or her wet feet on the weighing and foot drying machine while weighing himself or herself.

According to the second embodiment of the weighing and foot drying machine of the present invention, the foot dryers may simply be operated without requiring any specific switch operation since the dryers begin to operate with a person stepping onto the weighing and foot drying machine.

According to the third embodiment of the weighing and foot drying machine of the present invention, wet feet may be dried within a decreased time since the foot dryers provide warm air flow blowing therefrom.

DETAILED DESCRIPTION OF THE PREFERRED EMBODIMENT

Figure 1:
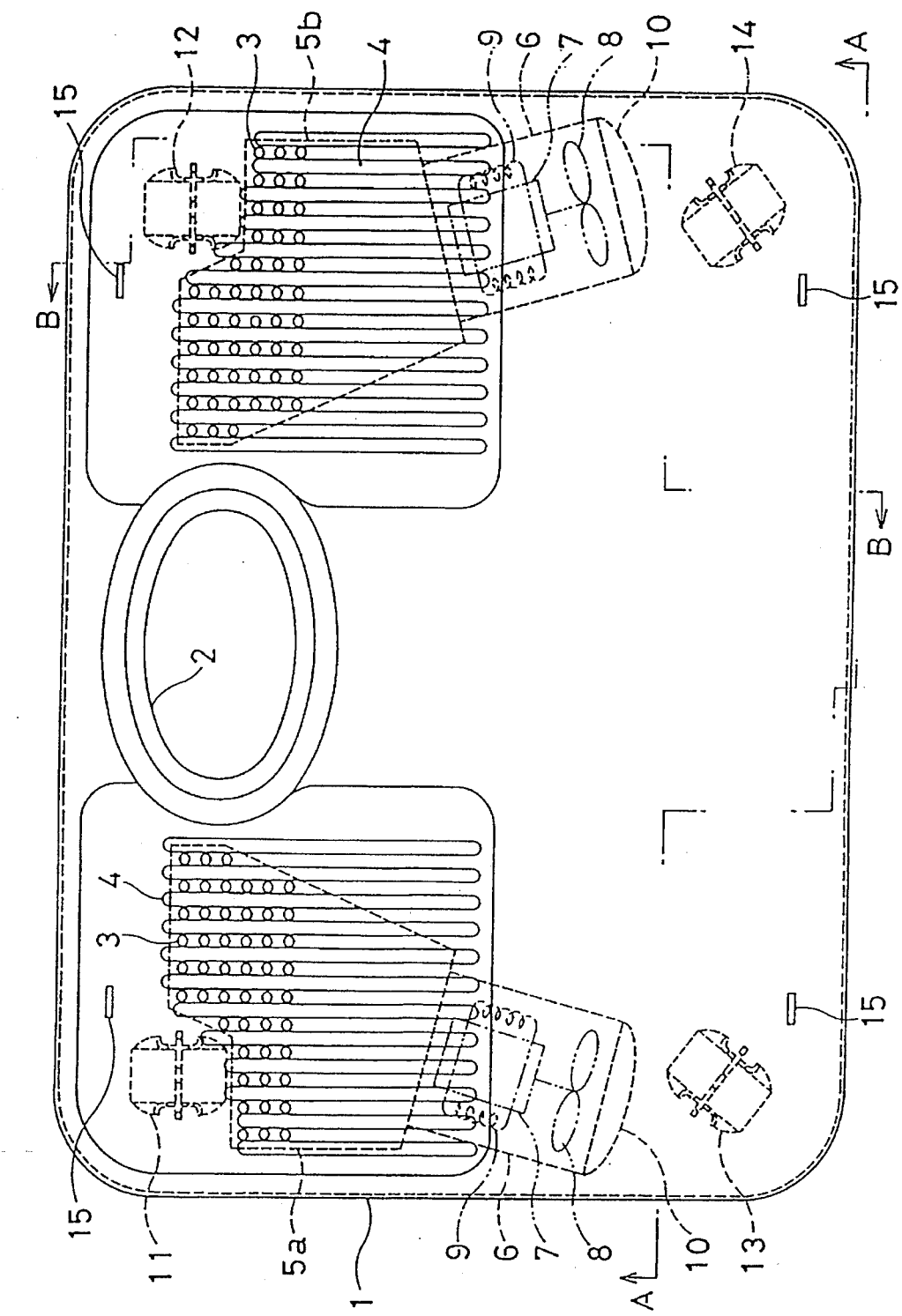
FIG. 1 is a plan view showing an upper casing of a weighing and foot drying machine according to an embodiment of the present invention.
Figure 2:
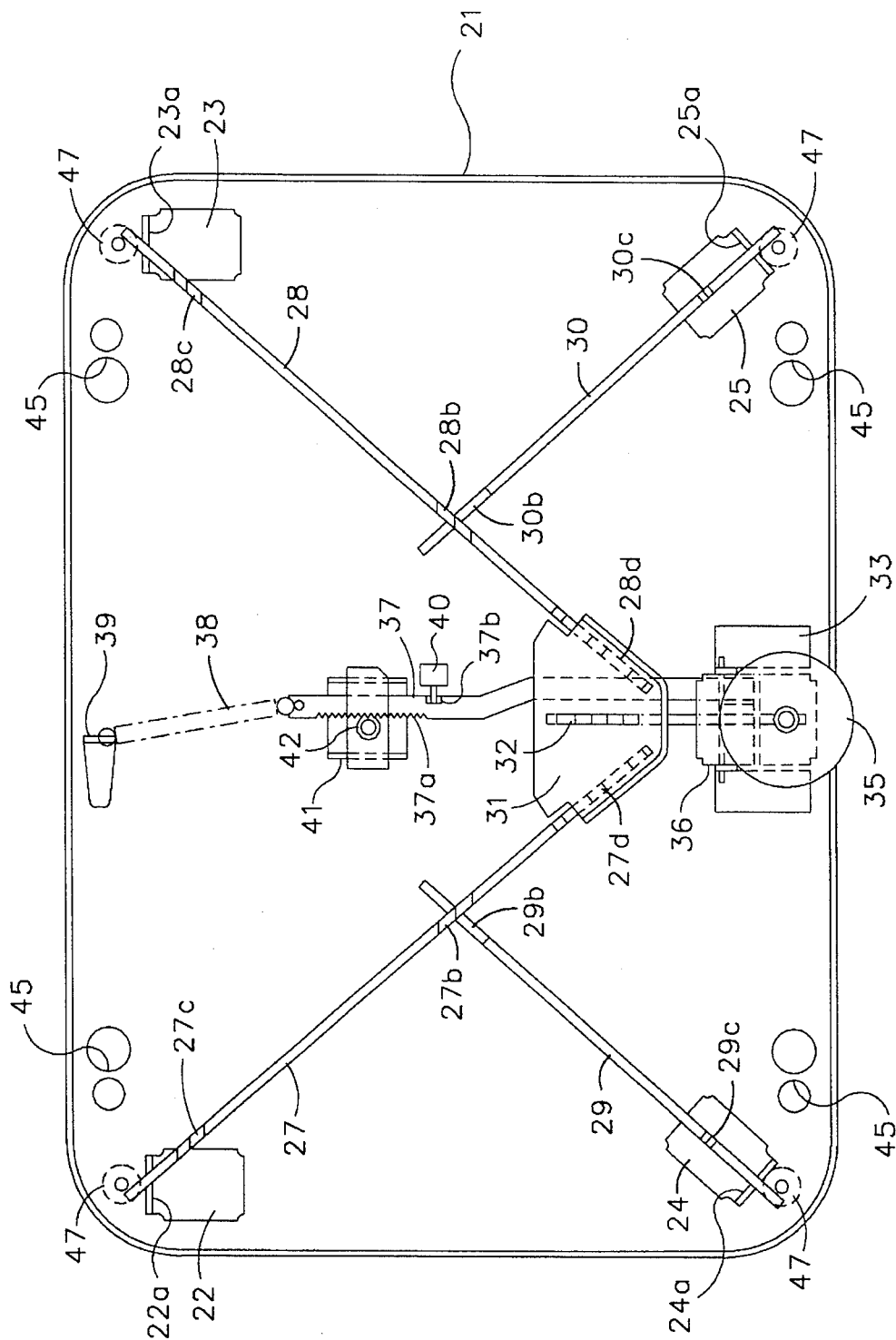
FIG. 2 is a plan view showing a lower casing of the weighing and foot drying machine according to the embodiment of the present invention.
Figure 3:
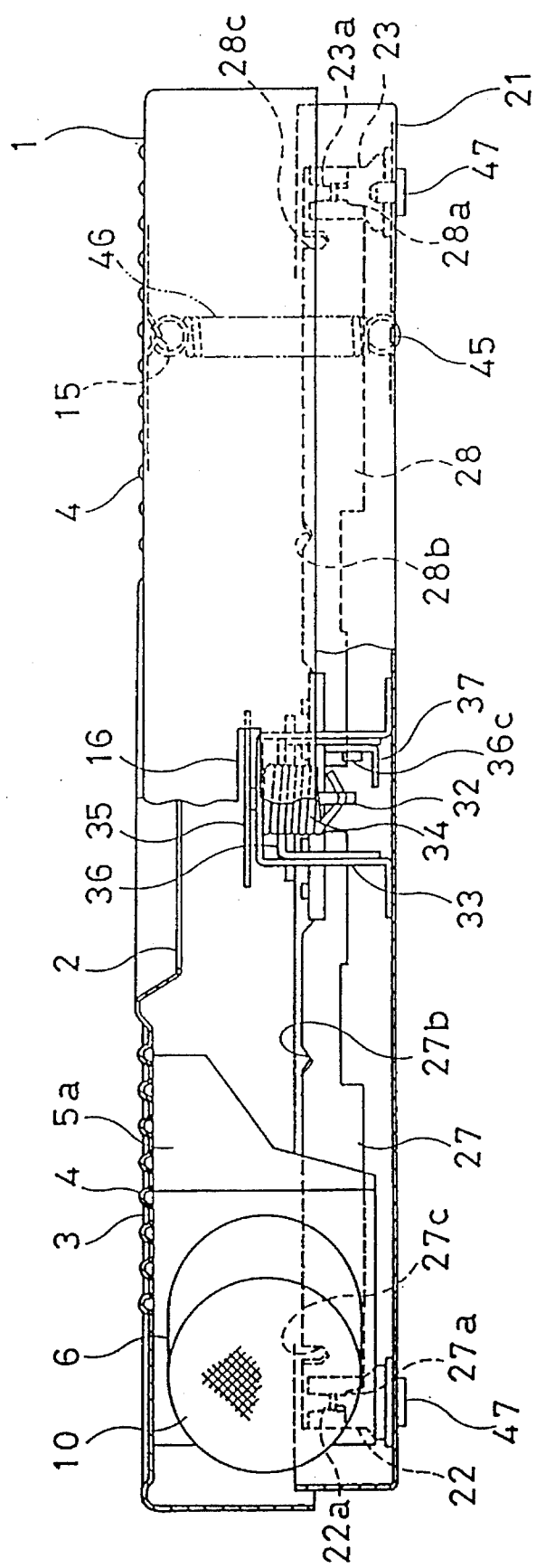
FIG. 3 is a section view showing a main part of the weighing and foot drying machine taken along the line A—A shown in FIG. 1, wherein the upper casing of FIG. 1 and the lower casing of FIG. 2 are assembled together.

An embodiment of the present invention will now be described with reference to the attached drawings. FIG. 1 is a plan view showing an upper casing of a weighing and foot drying machine (scales) according to an embodiment of the present invention, FIG. 2 is a plan view showing a lower casing of the weighing and foot drying machine, FIG. 3 is a section view showing a main part of the weighing and foot drying machine taken along the line A—A of FIG. 1, wherein the upper casing of FIG. 1 and the lower casing of FIG. 2 are assembled together, and FIG. 4 is an enlarged section view showing a main part of the weighing and foot drying machine taken along the line B—B of FIG. 1, wherein the upper casing of FIG. 1 and the lower casing of FIG. 2 are assembled together.

As shown in FIGS. 1–4, this type of weighing and foot drying machine is roughly divided into a left side group of instruments attached to the upper casing 1 and a right side group of instruments attached to the lower casing 21 respectively, and constructed by assembling the upper casings 1 and 21 using springs 46. Mechanisms of the foot dryers and the weighing machine are integrally assembled within a space enclosed by the upper and lower casings 1 and 21.

Figure 4:
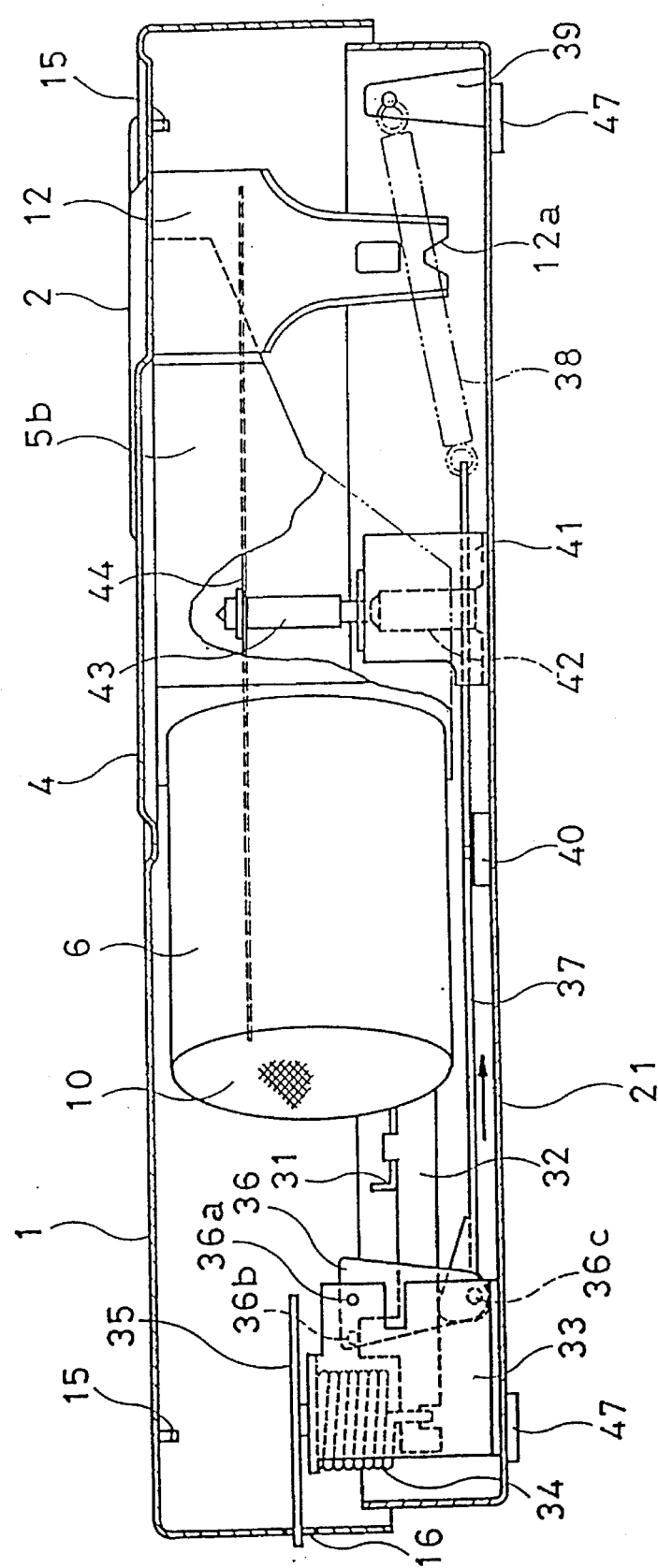
FIG. 4 is an enlarged section view showing a main part of the weighing and foot drying machine taking along the line B—B of FIG. 1, wherein the upper casing of FIG. 1 and the lower casing of FIG. 2 are assembled together.

The upper casing 1 has a display window 2 as shown in FIG. 1, disposed substantially in the center of upper portion of the top surface thereof so as to view a scale plate 44 as shown in FIG. 4, through the window 2. The top surface of the upper casing 1 is also provided with a left and right side group of blowout holes 3 made respectively at left and right side areas of the window 2 through each of which air flows are led for drying one's feet. All blowout holes 3 are made in grooves, each of which is formed between bead-shaped protrusions 4 to prevent the holes 3 from being sealed by the foot soles even when the soles are placed upon the blowout holes 3. The casing 1 itself is preferably made by a press working.

The back plane of the upper casing 1 is provided with a pair of ducts 5a and 5b, each of which communicates with respective one of the left and right side groups of the blowout holes 3. At each of the ends of the ducts 5a and 5b, blower 6 is disposed. Each of the blowers 6 has a respective motor 7 inside thereof. A fan 8 is attached to each of the rotating shafts of the motors 7. A heater 9 is also disposed around each of the motors 7, and an air intake portion 10 is disposed at each end of the blowers 6. Thereby, as each of motors 7 of the blowers 6 rotates the respective fan 8, air is drawn through the respective intake portion 10 to produce air flows, which are led to the respective group of the blowout holes 3 for blowing to dry one's foot through the respective ducts 5a or 5b. When each of the heaters 9 give out heat, the air flows passing through the respective heater 9 are warmed and blowing through the respective group of holes 3.

At each of four corners of the back plane of the upper casing 1, supporting members 11–14 are provided respectively, and each of the lower ends of the supporting members 11–14, a concave portion 12a is formed as shown FIG. 4. When the upper casing 1 and the lower casing 21 are assembled together, each of the supporting members 11–14 engages with the respective one of engaging portions 27c–30c of bar members 27–30 (described later) shown in FIG. 2 by given engaging members (not shown). Further, near each of the supporting members 11–14 of the casing 1, a hanger 15 is attached thereto for hanging the respective spring 46 used in assembling the casings 1 and 2 together.

As shown in FIG. 2, the lower casing 21 has receiving members 22–25, each of which is disposed at each of the four corners thereof, and by each of receiving members 22–25 each end of the bar members 27–30 is supported. That is, each of the receiving members 22–25 has the respective one of the concave portions 22a–25a formed as show in FIG. 3 and is posed on the respective one of the upper ends thereof. Each of the concave portions 22a–25a (24a and 25a are not shown in FIG. 3) engages with the respective one of cutouts 27a–30a (29a and 30a are not shown in FIG. 3) of the bar members 27–30, so that each end of the bar members 27–30 is supported by the respective one of receiving members 22–25. Middle portions 27b and 28b of the bar members 27 and 28, each of which has a longer length, and tip ends 29b and 30b of the bar members 29 and 30, each of which has a shorter length, engage with the bar members 29 and 30 respectively by given engaging members (not shown). Tip ends 27d and 28d of the bar members 27 and 28 are fixed to a connecting member 31. The connecting member 31 is supported in substantially horizontal with a supporting member 32. The supporting member 32 is supported by a spring 34 fixed to a mounting member 33. That is, the bar members 27 and 28 are respectively constructed between the receiving member 22, 23 and the connecting member 31; and the bar members 29 and 30 are respectively constructed between the receiving members 24 and 25, and the middle portions 27b and 28b of the bar members 27 and 28.

As shown in FIGS. 3 and 4, an adjustment member 35 for adjusting the height position of the spring 34 is provided on an upper portion of the mounting member 33. The adjustment member 35 is used in setting a zero adjustment for the scale plate 44 of the weighing and foot drying machine, part of which is protruding from the cutout 16 of the upper casing 1 after the upper and lower casings 1 and 21 are assembled together, so that the user of the weighing and foot drying machine can rotate the adjustment member 35 by his or her finger. A turning member 36 is rotatably mounted on the mounting member 33 through a supporting bar 36a attached on the member 36. The turning member 36 has a contacting member 36b which is in contact with the front surface of the supporting member 32 as shown in FIG. 4. Further, a lower end of the turning member 36 is connected to one end of a movable pole 37 through a connecting member 36c attached on the member 36. The other end of the movable pole 37 is biased towards the arrow shown in FIGS. 3 and 4 by a spring 38, a further end of which is connected to a fixed portion 39 attached to the casing 21. Therefore, the turning member 36 is biased normally in a counterclockwise direction as shown in FIG. 4 about the supporting bar 36a. When the height of the supporting member 32 is lowered against the biasing force of the spring 34, the turning member 36 is allowed to rotate about the supporting bar 36a.

As shown in FIG. 2, the movable pole 37 has a rack 37a formed thereon which engages with a pinion 42. The pinion 42 is supported in a rotatable manner by a mounting member 41 on the casing 21 and further coaxially extending a pole 43 therefrom as shown in FIG. 4. A scale plate 44 formed in a disc shape is fixed to a top portion of the pole 43. The movable pole 37 has a notch portion 37b formed at the middle portion thereof which engages with a limit switch 40, which is actuated to set on or off in accordance with the movement of the movable pole 37. The limit switch 40 functions as a switch both for the foot dryers for performing on and off control of each of the motors 7 of the blowers 6 and heaters 9.

The lower casing 21 has hangers 45 formed at each of the corners facing with the respective one of the hangers 15 of the upper casing 1, and to the hangers 45 and 15 one end of the respective one of springs 46 is hung as shown in FIG. 3, so that the upper and lower casings 1 and 21 are assembled together. The lower casing 21 has supporting legs 47 disposed at each of the corners of the bottom plane thereof, respectively.

In the weighing and foot drying machine configured as described above, the supporting members 11–14 press down the bar members 27–30 in response to the weight of the user when an user steps onto the top surface of the upper casing 1, and connecting member 31 and the supporting member 32 are lowered against the biasing force from the spring 34. The turning member 36 then rotates around the supporting bar 36a , and the movable pole 37 in turn moves towards the arrow shown in FIGS. 3 and 4. The linear movement of the movable pole 37 causes the limit switch 40 to turn one and to rotate the pinion 42 engaging with the lack 37a so that the scale plate 44 rotates correspondingly. Consequently, the weight of the user is displayed through the indicating window 2 of the upper casing 1, and the blowers 6 begin to blow air flows for drying the user's feet from the blowout holes 3 of the upper casing 1.

On the other hand, as the user steps down from the upper casing 1, the spring 34 returns to its normal position, and the connecting member 31 and the supporting member 32 return to its normal height so that the turning member 36 rotates in a counter direction (clockwise) to the direction described above, and the movable pole 37 similarly moves to the counter direction to that described above. The linear movement of the movable pole 37 causes the limit switch 40 to turn off, and the pinion 42 engaging with the lack 37a to rotate in a counter direction so that the scale plate 44 rotates to return to its original position. As a result of this, the scale plate indicates zero through the indicating window 2 of the upper casing 1 and the blowers 6 stop to end.

Therefore, according to the embodiment of the present invention of weighing and foot drying machine, the user can measure his or her weight, during which the user can also dry his or her wet feet simply by stepping onto the upper casing 1, since the blowers 6 operate to blow air flows through the blowout holes 3 for drying the user's feet. Then, stepping down from the upper casing 1 stops the blowers 6 to operate.

Figure 5:
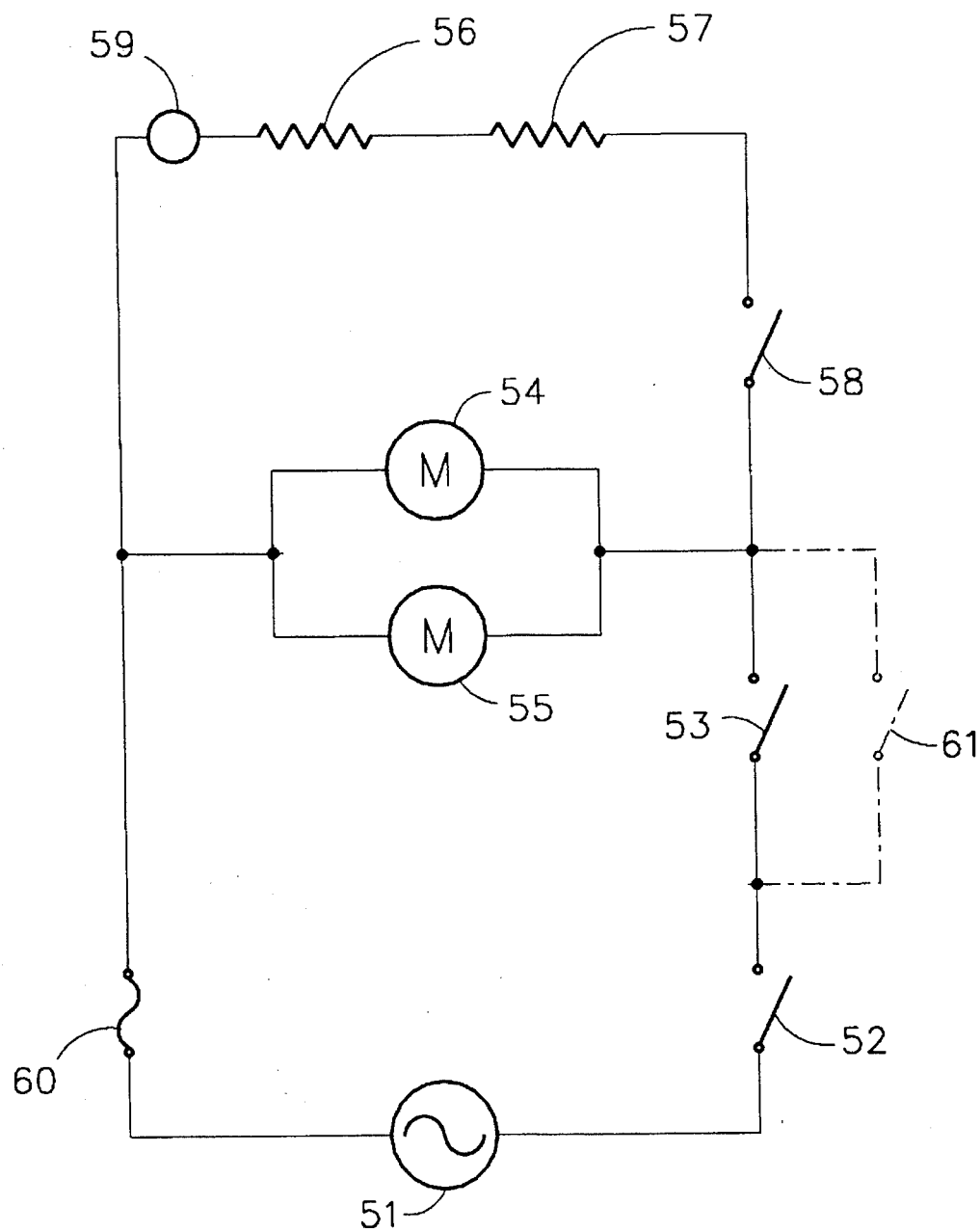
FIG. 5 is a circuit diagram showing a circuit arrangement for the weighing and foot drying machine of an embodiment of the present invention.

The description will now be made generally with regard to an arrangement of a electric circuit of the embodiment of the weighing and foot drying machine described above. FIG. 5 is a circuit diagram showing the electric circuit for the weighing and foot drying machine of the embodiment of the present invention.

As shown in FIG. 5, a commercial power source 51 supplying 100 V AC power is electrically connected in parallel with two motors 54 and 55 via a power switch 52 and a limit switch 53. The motors 54 and 55 are DC motors which are electrically connected to the power source 51 via a rectifier circuit (not shown). In a normal operating condition, the power switch 52 is set to the on position so that the limit switch 53 turns on or off to control the operations of the motors 54 and 55 in response to the user stepping onto or off from the weighing and foot drying machine. The limit switch 53 corresponds to the limit switch 40 described above, and the motors 54 and 55 correspond to the motors 7 of the blowers 6 shown in FIG. 1.

The motors 54 and 55 are electrically connected in parallel with heaters 56 and 57, which are electrically connected in series with each other. The heaters 56 and 57 are disposed about the motors 54 and 55, respectively. By turning on a heater switch 58, the heaters 56 and 57 are set to a heating state. Therefore, the limit switch 53 operates on or off, which in turn controls the heaters 56 and 57 to be heated or not in response to the user to stepping onto or off from the weighing and foot drying machine when the heater switch 58 is set to the on state. The heaters 56 and 57 correspond to the heater 9 described above and shown in FIG. 1. Note that the heaters 56 and 57 may be electrically connected to each of the motors 54 and 55 in parallel, respectively. A bimetal 59 is attached to the heaters 56 and 57 for preventing overheat to ensure their safety. In addition, a fuse 60 is inserted in series with the source 51 to ensure the safety of the whole circuit.

It should be noted that in the embodiment of the present invention, the driving of the motors 54 and 55 is controlled by the limit switch 53 to set to the on or off state, but the motors 54 and 55 may also be controlled manually by separately connecting a switch 61 in parallel with the switch 53, as shown by the two-dot chain line of FIG. 5. By operating the switch 61, the user can operate the foot dryers if necessary without the user stepping onto the upper casing 1. Further, although the commercial power source 51 is employed for this circuit arrangement, the motors 54 and 55 may be powered by a battery or the like instead of the commercial power source 51 so as to operate the blowers 6. Instead of the limit switch 53, other switch may also be employed.

The weighing and foot drying machine of this embodiment has thus the structure as mentioned above for weighing the user, and the foot dryers including the ducts 5a and 5b and blowers 6 for drying the user's feet placed thereon, the weighing machine being integrally assembled with the foot dryers. Therefore, the weighing and foot drying machine of the present invention is manufactured by integrally assembling the weighing machine and the foot dryers, and is a commercially available machine, so that the manufacturing cost of the weighing and foot drying machine of the present invention may be lowered as compared with the weighing machine and the foot dryers of the prior art, which must be separately purchased, and that the machine of the present invention is favorable for promoting mass sales. Consequently, the weighing and foot drying machine of the present invention can be used not only with the average home, but also with several facilities including public bathhouses, recreation centers, aged people's homes, hotels, club houses for golf courses and the like thus to increase the popularity thereof. Furthermore, the machine of the present invention requires only a small space to place, so that it can promote space-saving. In addition, the weighing and foot drying machine of the present invention can easily be used by the user since it can dry his or her feet simultaneously with weighing himself or herself.

Furthermore, by using the limit switch 40, the foot dryers of the present invention including blowers 6 cannot only be operated to dry his or her feet simply by the user stepping onto the weighing and foot drying machine, but also be stopped by the user stepping down from the weighing and foot drying machine. There is no need for the user to manage a complicated switch operation; that makes the machine easier to operate.

Furthermore, by using the heater 9 in order to blowing warm air flows from the foot dryers, the wet feet can be dried in a shorter time, thus allowing the drying efficiency to be increased; that is, the time required for drying the wet feet can be shortened, thus making the user more ready to use the machine during a busy period. In particular, such as in winter, the user's toe is kept warmed by the warm air flows, thus increasing the utility of the weighing and foot drying machine.

While the present invention has been described with reference to the embodiment as mentioned above wherein the air flows are provided only for drying one's feet through the blowout holes 3, an ozonizer may be also provided in the ducts 5a and 5b to blow air flows mixed with ozone gas, and thus to enable to provide sterilization and deodorization effects such that one may dry one's bare feet in a good sanitary condition. Further, an ultraviolet rays generator may be provided under the blowout holes 3 to allow exposure of the ultraviolet rays to one's feet so that it could provide some preventive effect of the ultraviolet rays against dermatophytosis.

While the embodiment mentioned above has been described with reference to the weighing and foot drying machine wherein the upper casing 1 has a plurality of groups of the blowout holes 3 disposed in the top surface thereof to blow air flows for drying one's feet, a projecting portion may be provided in front of the upper casing, and provided with plurality off blowout holes to blow the air flows for drying one's feet in a horizontal direction along the top surface of the upper casing. Further, a covering portion may be provided in front of the upper casing 1 and a plurality of blowout holes are formed in the covering portion to blow the air flows for drying one's feet, thereby drying the user's toe more effectively by plunging user's toe into the covering portion.

Furthermore, while the embodiment mentioned above has been described with reference to the weighing and foot drying machine which uses the disc-shaped scale plate 44 to indicate the user's weight, an electric digital display may be employed instead of the mechanical scale plate 44. Also for explaining the structure of measuring the user's weight, the mechanical structure is described in,the embodiment mentioned above, however it is not intended to limited to the present invention, but it may alternately be used with an electric structure, for example. In short, the weighing and foot drying machine according to the present invention may have any structure so long as it has the structure integrally assembled the weighing machine and foot dryers together.

Furthermore, while the embodiment mentioned above has been described with reference to the specific weighing and foot drying machine which uses two blowers to produce air flows for drying one's feet, and the ducts and the blowers are assembled by attaching to the upper casing side, a single blower may employed for producing air flows to blow for foot dry, and it may also be employed an structure attaching a mechanism such as a blower to the lower casing side.

As described above, the weighing and foot drying machine of the present invention is a machine in which the weighing machine is integrally assembled with the foot dryers so that it may have a simplified structure, thus allowing the weighing and foot drying machine to be simple and to have a lowered cost and potential demand to increase the popularity. In addition, since the user can dry his or her feet during the weighing of himself or herself, it provide usage of ease.

Since the foot dryers are operated simply by user stepping onto the weighing and foot drying machine without switch operation, it provides usage of further increased ease.

Since the foot dryers blow warm air flows, the wet feet can be dried in a shorter time so as to increase efficiency of drying.

What is claimed is:

1. A weighing and foot drying machine comprising;

a weighing machine for measuring one's weight; and a pair of foot dryers for drying user's feet standing on said weighing and foot drying machine; wherein the weighing machine is integrally assembled with said foot dryers.

2. A weighing and foot drying machine as claimed in claim 1, the foot dryers are operated in response to the user stepping onto said weighing and foot drying machine.

3. A weighing and foot drying machine as claimed in claim 1, said foot dryers blow warm air.

* * * * *